March 9, 1926.

W. H. JEANS

CROWDER FOR MEAT CHOPPERS

Filed August 19, 1924

1,575,840

Inventor
W. H. Jeans
By his Attorneys
Cooper, Kerr & Dunham

Patented Mar. 9, 1926.

1,575,840

UNITED STATES PATENT OFFICE.

WILLIAM HAMILTON JEANS, OF DAYTON, OHIO, ASSIGNOR TO DAYTON SCALE COMPANY, OF DAYTON, OHIO, A CORPORATION OF NEW JERSEY.

CROWDER FOR MEAT CHOPPERS.

Application filed August 19, 1924. Serial No. 732,928.

*To all whom it may concern:*

Be it known that I, WILLIAM HAMILTON JEANS, a citizen of the United States of America, residing at Dayton, in the county of Montgomery and State of Ohio, have invented certain new and useful Improvements in Crowders for Meat Choppers, of which the following is a full, clear, and exact description.

This invention relates to improvements in meat choppers and more particularly to crowder devices to enable the user of the chopper to crowd the meat or other material in the bowl down against the worm without the operator utilizing his fingers for this purpose.

The invention further contemplates the provision of a crowder of such nature that it may be used in connection with meat bowls in which a pan is superposed thereon. Previous crowders heretofore proposed have contemplated the provision of a crowder member operating through the top opening of the bowl. In the present construction the crowder is disposed at the side of the bowl and in this way may be operated irrespective of a large pan clamped to the top of the bowl.

Figure 1:
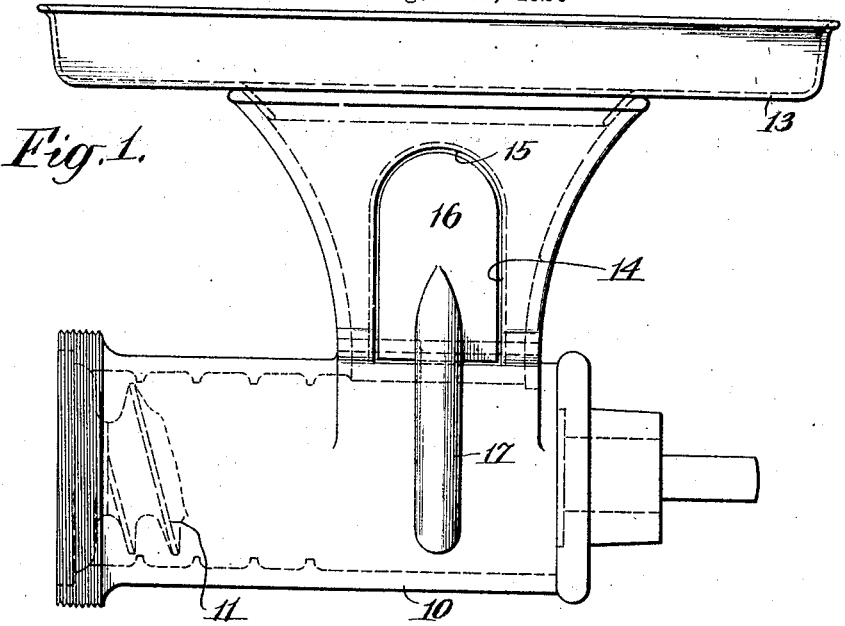
Fig. 1 is a side view of a chopper provided with my improvement.
Figure 2:
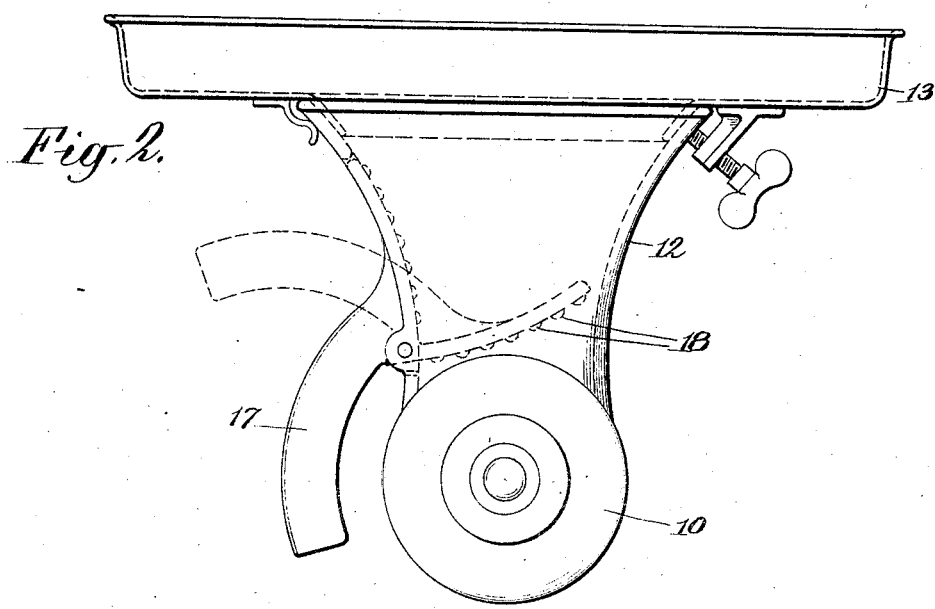
Fig. 2 is an end elevation.

The meat chopper comprises the usual barrel 10 receiving the worm 11 and provided with a flaring bowl 12. The bowl 12 is of such configuration that a supplementary material pan 13 can be placed and clamped thereon, if desired. One side of the bowl 12 is apertured with a substantially rectangular aperture 14 curved at the top as shown at 15. Pivoted within this aperture and adapted to form a part of the bowl wall is a crowder member 16 so arranged that, when in normal position, it closes the aperture 14 and 15. The plate-like member 16 is provided with an operating handle 17 and is also provided with material engaging teeth 18. The use of the crowder will be readily apparent. After the material is placed in the bowl the operator draws upwardly upon handle 17 and thus presses the material within the bowl 12 down against the worm 11.

What I claim is—

1. In a meat chopper, in combination with a bowl, a worm and a pivoted crowder member disposed in the side wall of the bowl and normally forming a closure for an opening therein, said crowder member upon inward displacement being adapted to crowd the material in the bowl into contact with the worm.

2. In a meat chopper having in combination, a bowl with a worm therein, a pivotally mounted crowder member disposed in and forming a closure for an opening in one side of the bowl and an operating handle therefor arranged so as to be manipulated without interference with a pan or like receiver disposed upon the top of the bowl.

3. In a meat chopper having in combination, a bowl with a worm therein, a crowder member normally serving as a part of the wall of the bowl, and a handle device for tipping said crowder member to force the material in the bowl towards the worm.

4. In a meat chopper, in combination, a bowl having a worm therein, a substantially rectangular opening in one side of the bowl, a closure plate for said opening, a pivot support for said closure plate, a handle for said closure plate, and teeth upon said plate for gripping the material in the bowl upon the pivotal rocking of said plate for the purpose described.

In testimony whereof I hereto affix my signature.

WILLIAM HAMILTON JEANS.